US008895158B2

(12) United States Patent
Trexler et al.

(10) Patent No.: US 8,895,158 B2

(45) Date of Patent: Nov. 25, 2014

(54) NANOPARTICLE TAGGANTS FOR EXPLOSIVE PRECURSORS

(75) Inventors: Morgana M. Trexler, Baltimore, MD (US); Dajie Zhang, Baltimore, MD (US); Lisa A. Kelly, Ellicott City, MD (US); Jennifer L. Sample, Bethesda, MD (US); John M. Brupbacher, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 162 days.

(21) Appl. No.: 13/566,074

(22) Filed: Aug. 3, 2012

(65) Prior Publication Data

US 2013/0040150 A1 Feb. 14, 2013

Related U.S. Application Data

(60) Provisional application No. 61/522,035, filed on Aug. 10, 2011.

(51) Int. Cl.
*B32B 27/32* (2006.01)
*B32B 27/40* (2006.01)

(52) U.S. Cl.
USPC ........... 428/690; 428/697; 428/701; 428/702; 428/424.8; 428/425.6; 428/425.9; 428/428; 428/432

(58) Field of Classification Search
USPC ........... 428/697, 699, 701, 702, 423.3, 424.8, 428/425.6, 425.9, 428, 432, 690
See application file for complete search history.

(56) References Cited

U.S. PATENT DOCUMENTS

| | | | | |
|---|---|---|---|---|
| 6,833,192 | B1 | 12/2004 | Caruso et al. | |
| 7,244,413 | B2 | 7/2007 | Barbera-Guillem | |
| 7,292,766 | B2 | 11/2007 | Anderson et al. | |
| 7,368,086 | B2 | 5/2008 | Nasaani | |
| 7,682,523 | B2 | 3/2010 | Weisman et al. | |
| 7,785,717 | B2 | 8/2010 | Barbera-Guillem | |
| 2007/0054067 | A1* | 3/2007 | Power | 428/32.22 |
| 2009/0171330 | A1 | 7/2009 | Taylor et al. | |
| 2009/0220789 | A1 | 9/2009 | DeSimone et al. | |
| 2010/0172994 | A1 | 7/2010 | Sigmund et al. | |
| 2010/0291474 | A1 | 11/2010 | Baran, Jr. | |
| 2012/0264588 | A1* | 10/2012 | Kolb et al. | 501/134 |

* cited by examiner

*Primary Examiner* — Thao T. Tran

(74) *Attorney, Agent, or Firm* — Noah J. Hayward

(57) ABSTRACT

An article includes a substrate with a plurality of independent taggant layers that each include metal oxide nanocrystals doped with at least one Lanthanide element. Each taggant layer includes metal oxide nanocrystals doped with a different Lanthanide element than each other taggant layer.

14 Claims, 1 Drawing Sheet

NANOPARTICLE TAGGANTS FOR EXPLOSIVE PRECURSORS

CROSS-REFERENCE TO RELATED APPLICATIONS

This application claims priority to and the benefit of prior-filed and U.S. Provisional Application No. 61/522,035 filed on Aug. 10, 2011, the entire contents of which are hereby incorporated herein by reference.

STATEMENT OF GOVERNMENTAL INTEREST

This invention was made with government support under contract number N00014-05-1-0856 awarded by the Office of Naval Research (ONR). The government has certain rights in the invention.

BACKGROUND

1. Field of the Invention

Example embodiments generally relate to nanoparticle taggants and, more particularly, relate to methods for constructing nanoparticle taggants for application to substrates.

2. Description of the Related Art

The issues of authentication and counterfeit deterrence can be important in many contexts. Bills of currency, stock and bond certificates, credit cards, passports, driver licenses, as well as many other legal documents all must be reliably authentic to be useful. Museums and art galleries face such challenges when authenticating works of art. Additionally, consumer products and other articles of manufacturing, such as pharmaceuticals, books, movies, software, etc., are frequently the subject of counterfeiting in the form of "pirated" versions or "knock-offs."

A wide variety of attempts have been made to limit the likelihood of counterfeiting. Most such attempts tend to incorporate a unique identifier, or taggant, into the potentially counterfeited item. For example, some have utilized fluorescent compounds as identifiers for these items. Fluorescence occurs when a material is irradiated with electromagnetic radiation and at least some is absorbed. The emitted fluorescence can then be read by suitable means to ensure authenticity.

SUMMARY OF THE INVENTION

Exemplary embodiments of the present invention include an article having a substrate with a plurality of independent taggant layers that each include metal oxide nanocrystals that are doped with at least one Lanthanide element, wherein each taggant layer includes metal oxide nanocrystals that are doped with a different Lanthanide element than each other taggant layer.

In addition, exemplary embodiments of the present invention include an article having a substrate with a plurality of independent taggant layers that each include metal oxide nanocrystals that are doped with at least one Lanthanide element, wherein each taggant layer includes metal oxide nanocrystals that are doped at a different molar concentration than each other taggant layer.

The accompanying drawings, which are incorporated in and constitute a part of this specification, illustrates one or more embodiments of the invention and, together with the description, serves to explain the principles of the invention.

BRIEF DESCRIPTION OF THE DRAWINGS

Figure 1:
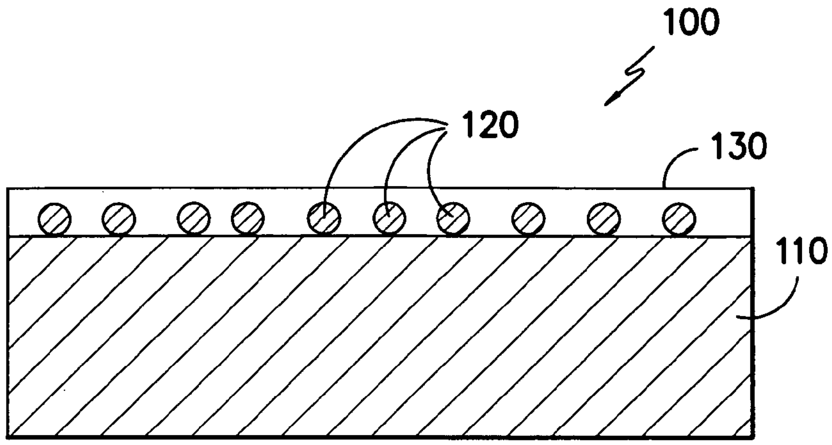
Figure 2:
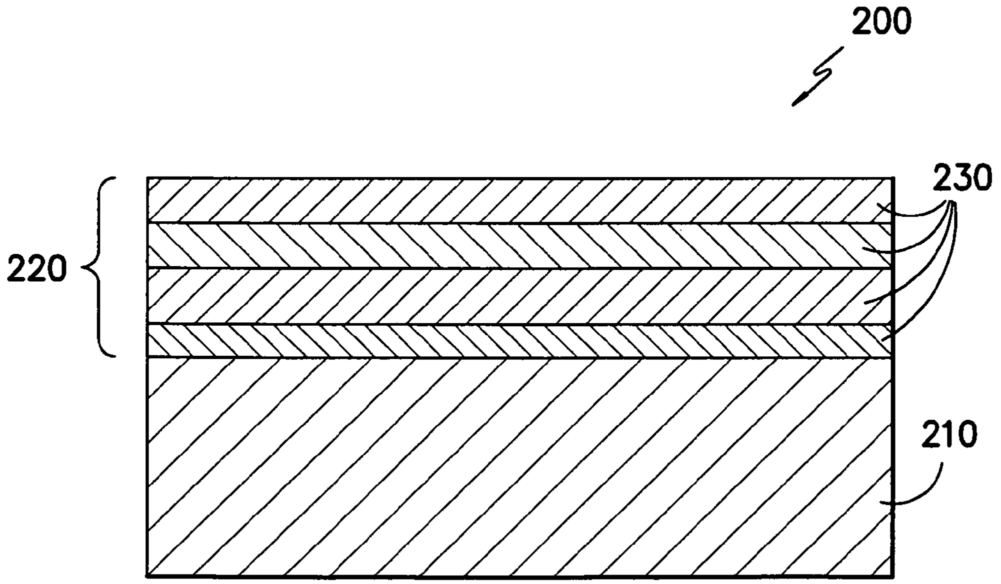

Having thus described exemplary embodiments of the invention in general terms, reference will now be made to the accompanying drawings, which are not necessarily drawn to scale, and wherein:

FIG. 1 illustrates a side view of a nanoparticle taggant in accordance with an example embodiment of the present invention; and FIG. 2 illustrates a side view of a nanoparticle taggant in accordance with another example embodiment of the present invention.

Repeat use of reference characters in the present specification and drawings is intended to represent same or analogous features or elements in exemplary embodiments of the invention.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Exemplary embodiments of the present invention relate generally to nanoparticle taggants for application to various substrates. As indicated above, taggants, based on their unique codes, can be used for the authentication of products and documents, as well as used by brand owners and governments to authenticate commonly counterfeited items. FIG. 1 illustrates a side view of a nanoparticle taggant 100 in accordance with an embodiment of the present invention. As shown, nanoparticle taggant 100 includes a base substrate layer 110, a nanoparticle layer 120, and a transparent top coating 130.

The base substrate layer 110 may include any material for which the application of a nanoparticle taggant is desired. For example, base substrate layer 110 may include various types of metals, plastics and polymers, or paper for use in conjunction with one or more example embodiments of the present invention. By way of example, in certain embodiments of the invention, base substrate layer 110 may be constructed of paper to aid in the authentication of currency. In additional embodiments, base substrate layer 110 may be constructed of various polymers, including high density polyethylene, for use as labels for pharmaceuticals or other items that require authentication. The user's specifications will dictate the necessary material utilized for the base substrate layer 110.

The nanoparticle layer 120 of one or more example embodiments of the present invention provides the unique and non-reproducible or "finger-print" like pattern used for authentication. The materials-utilized for the construction of nanoparticle layer 120 have unique fluorescent behaviors that, when excited by a laser, emit fluorescent signals that may be detected by either a spectrofluorometer or by fluorescence microscopy. Accordingly, nanoparticle layer 120 may be constructed of any materials known in the art to produce such unique fluorescent behavior.

For example, in some embodiments, nanoparticle layer 120 may be created from doped metal oxide nanocrystals. Such nanocrystals include a metal oxide and a dopant comprised of one or more rare earth elements. In embodiments of the present invention, suitable metal oxides may include yttrium oxide, zirconium oxide, zinc oxide, copper oxide, gadolinium oxide, praseodymium oxide, lanthanum oxide, and combinations thereof. In addition, the dopant material may include elements from the Lanthanide series (elements 58-71) of the periodic table. Such suitable dopants include, but are not limited to, europium (Eu), cerium (Ce), neodymium (Nd), samarium (Sm), terbium (Tb), gadolinium (Gd), holmium (Ho), thulium (Tm), an oxide thereof, and combinations thereof.

Any method known in the art may be utilized for the production of the doped metal oxide nanocrystals. For example, in some embodiments, a sol-gel process may be utilized where carbon black may be optionally used as a template in the synthesis. Further, in additional embodiments, an organometallic reaction may be utilized.

The dopant materials are incorporated into the doped metal oxide nanocrystals in a sufficient amount to permit the doped metal oxide nanocrystals to be put to practical use in fluorescence detection as described herein. An insufficient amount may comprise either too little dopant, which would fail to emit sufficient detectable fluorescence, or too much dopant, which would cause reduced fluorescence due to concentration quenching. Accordingly, in such embodiments where doped metal oxide nanocrystals are utilized, the molar amount of the dopant material may range from about 1% to about 10%. In additional embodiments, the molar amount of the dopant material may range from about 3% to about 5%. Applicants have found that variations in dopant concentrations may alter measured characteristics of the nanoparticle materials with either a spectrofluorometer or a fluorescence microscope, leading to greater efficiency as a taggant. The particular use of one or more example embodiments of the present invention may dictate the necessary atomic concentration utilized.

Following their preparation, the doped metal oxide nanocrystals may be annealed. Through such annealing process, the particle size of the doped metal oxide nanocrystals may be increased. In particular, Applicants have found that increases in annealing temperatures have lead to increased intensities in fluorescence. Such variations in fluorescence, based on the annealing temperatures, accordingly, may aid in the authentication processes discussed herein by providing a user with additional options in creating a unique taggant. In embodiments of the present invention where the doped metal oxide nanocrystals are annealed, such annealing may be accomplished at temperatures, in some embodiments, ranging from about 500° C. to about 1300° C. In additional embodiments, the doped metal oxide nanocrystals may be annealed at temperatures ranging from about 650° C. to about 1100° C.

After the materials utilized within the nanoparticle layer 120 have been prepared, any known method in the art may be utilized for nanoparticle layer's 120 application to base substrate layer 110. For example, in some embodiments, nanoparticle layer 120 may be sprayed onto base substrate layer 110. In such embodiments, the doped metal oxide nanocrystals may be in slurry form prior to their application by spraying. In another embodiment, the doped metal oxide nanocrystals may be in a powered form and applied in a "sprinkling" manner over base layer substrate layer 110. The user's specifications will dictate the necessary application process utilized.

Following the application of nanoparticle layer 120, transparent top coating 130 may be applied to nanoparticle layer 120, opposite base substrate layer 110, as shown in FIG. 1. Transparent top coating 130 allows for the protection of the materials utilized in nanoparticle layer 120, yet is made of a transparent material such that the fluorescence displayed by the components of nanoparticle layer 120 may be seen. Transparent top coating 130 may be constructed of any polymer that provides a substantially clear coating and does not negatively affect the fluorescent properties exhibited by the nanoparticle layer 120. Suitable materials for use as transparent top coating may include, but are not limited to, high density and low density polyethylene, polypropylene, polyurethane and mixtures thereof. The particular material utilized for transparent top coating may be based on the user's specifications.

Utilizing the example embodiment described above, one or more example embodiments of the present invention further contemplate associated methods for providing nanoparticle taggant 100 with unique codes or "fingerprint" like structures for authentication of various items, including currency and labels for various products. One such method may include constructing nanoparticle layer 120 with doped metal oxide nanocrystals having various atomic ratios. As discussed herein, such alterations in atomic ratios may be accomplished by varying molar concentrations of dopant materials within nanoparticle layer 120, and/or by providing doped metal oxide nanocrystals that utilize various dopants. As mentioned above, variations in such categories will provide measured results with numerous "codes", as readings from a spectrofluorometer or a fluorescence microscope will include various wavelength readings, various intensity readings, and unique color fluorescent imaging. Depending on the user's choices for varying atomic ratios within the parameters described above, a unique nanoparticle taggant 100, based on readings from the spectrofluorometer and/or a fluorescence microscope, may be created that is not easily reproducible. Accordingly, once such taggant has been created, the readings produced may be stored, and optionally indexed, for later review of authentic materials by comparing the stored nanoparticle taggant 100 with the item in question.

Another method, which may be used alone or in conjunction with the above-described method, for providing nanoparticle taggant 100 with unique codes may be based on the application of nanoparticle layer 120 to base layer substrate 110. In many instances, nanoparticle layer 120 may not completely cover base layer substrate 110 through the spraying, "sprinkling", or other suitable application method. As such, base layer substrate 110 will include unique designs that can be viewed based on the presence of the above-described fluorescent materials of nanoparticle layer 120, or the absence of such materials and the remaining visible areas of base layer substrate 110. Because such application process of nanoparticle layer 120 is random as to its adhesion to base substrate layer 110, the presence or absence of nanoparticle layer 120 will be unique and non-reproducible for each application. Accordingly, once such taggant has been created, the readings produced may be stored, and optionally indexed, for later review of authentic materials by comparing the stored nanoparticle taggant 100 with the item in question.

FIG. 2 illustrates a side view of a nanoparticle taggant 200 in accordance with another example embodiment of the present invention. As shown in the figure, nanoparticle taggant 200 is constructed of a base substrate layer 210, and an authentication layer 220. As further shown in the figure, authentication layer 220 includes taggant layers 230. As with the example embodiment described above, nanoparticle taggant 230 may be used for the authentication of products and documents, as well as being used by brand owners and governments to authenticate commonly counterfeited items. As such, base substrate layer 210 may be constructed and selected in the same manner as base substrate layer 110.

As shown in FIG. 2, authentication layer 230 includes multiple taggant layers 230. Taggant layers 230 provide nanoparticle taggant 200 with the unique code for authenticating certain items by creating a "barcode-like" design that is not easily reproducible and can be viewed by a spectrofluorometer and/or a fluorescence microscope. Taggant layers 230 may be constructed of various polymers and/or glass including, but not limited to, high density and low density polyethylene, polypropylene, polyurethane and mixtures thereof, with varying thicknesses from about 0.01 μm to about 10 μm. In addition, although nanoparticle taggant 200 is shown with four taggant layers 230, any number of taggant layers may be utilized, for example, two, three, four, five, and six or more taggant layers 230 may be used in association with nanoparticle taggant 200. As will be appreciated by those skilled in the art, the addition of more taggant layers may allow the user to provide an even more unique taggant, accordingly, the user's preferences will dictate the discussed variations of taggant layers 230.

To provide taggant layers 230 with their unique codes, taggant layers 230 further include materials known in the art to produce the unique fluorescent behavior as exhibited by nanoparticle layer 120 of the example embodiment described above. Suitable materials for taggant layers include those mentioned above, as well as their method of production, dopant concentrations, etc. In addition, the fluorescent materials may also be applied to taggant layers 230 by the use of any suitable techniques, including, but not limited to, spraying, "sprinkling" from a powered form and doping.

Utilizing the example embodiment described above, additional embodiments of the present invention further include associated methods for utilizing nanoparticle taggant 200. One such method may include constructing each taggant layer 230 with doped metal oxide nanocrystals having various atomic ratios by, as indicated above, varying molar concentrations of dopant materials within each taggant layer, and/or by providing doped metal oxide nanocrystals on each taggant that utilize various dopants. As such, each taggant layer 230 will have a unique reading from a spectrofluorometer and/or a fluorescence microscope. Accordingly, the combination of readings from all taggant layers will be unique and not easily reproducible. After which, the readings produced may be stored, and optionally indexed, for later review of authentic materials by comparing the stored nanoparticle taggant 200 with the item in question.

Another method, which may be used alone or in conjunction with the above-described method, for providing nanoparticle taggant 200 with unique codes may be based on the application of the fluorescent material to taggant layers 230. As discussed with the example embodiment described above, the fluorescent materials may not completely cover taggant layers 230 through spraying, "sprinkling", or other suitable application method. As such, taggant layers 230 will include unique designs that can be viewed based on the presence of the above-described fluorescent materials, or the absence of such materials and the remaining visible areas of taggant layers 230. Because such application process of fluorescent materials is random as to its adhesion to taggant layers 230, the presence or absence of such fluorescent materials will be unique and non-reproducible for each application. Again, the use of multiple taggant layers 230 may aid in creating an even more unique taggant, as additional patterns of fluorescent materials may be present. Again, once nanoparticle taggant 200 has been created, the readings produced may be stored, and optionally indexed, for later review of authentic materials by comparing the stored nanoparticle taggant 200 with the item in question.

Yet another example embodiment includes a mold and fluorescent ink for the production of a taggant. In such embodiments, a mold may be fabricated from the composite of micron fibers and metal. Suitable micron fibers for use in one or more example embodiments of the present invention may include, but are not limited to, alumina carbide, silicone carbide, titanium carbide, combinations thereof and others, where the fibers include a diameter from about 1 to about 20 microns in diameter, or from about 5 to about 10 microns in diameter. In addition, the metal utilized in one or more example embodiments of the present invention for the construction of the mold may include aluminum, nickel, tin, lead, zinc, combinations thereof, and others. Once a suitable composite is selected, the composite may be polished by any suitable means to arrive at a substantially flat surface. After which, a portion of the composite may be etched away, by any suitable means, such that a portion of the micron fibers are exposed. The random orientations of the remaining micron fibers form a suitable mold that is not easily reproducible and is suitable for use as a taggant.

The fluorescent ink utilized in the example embodiment described above may be constructed from any of the doped metal oxide nanocrystals mentioned above. The ink may be created by the doped metal oxide nanocrystals' dispersion in a water bath that may include surfactants, for example, abietic acid, diglyceride and others, as well as other stabilizing agents, including, but not limited to acetic acid, formic acid, uric acid, and others. Once a fluorescent ink has been created, it may be placed within the mold for transferring the fluorescent ink to a substrate like those contemplated for base substrate layers 110 and 210 as discussed above. In addition, after the ink has been transferred to the substrate, a transparent top coating, like that contemplated with respect to the example embodiment described above, may be applied to the ink. Such transparent top coating may aid in maintaining the orientation of the ink in the molded configuration.

Utilizing the example embodiment described above, the present invention further includes associated methods for utilizing the mold and fluorescent inks as a taggant. As indicated above, the uniqueness of the mold allows for the imprint of ink to a suitable substrate to be utilized in a method of authenticating an item. Accordingly, after the ink has been transferred to a suitable substrate, the unique design on the ink may be stored and optionally indexed, for later review of authentic materials by comparing the stored design with the item in question.

In addition, another suitable method that can be utilized together with the above-described method or independently, includes constructing the fluorescent ink with doped metal oxide nanocrystals having various atomic ratios. As indicated above, this may be accomplished by varying molar concentrations of dopant materials within the ink and/or by providing doped metal oxide nanocrystals that utilize various dopants. As such, the fluorescent ink printed to the substrate will have a unique reading from a spectrofluorometer and/or a fluorescence microscope. After which, the readings produced may be stored, and optionally indexed, for later review of authentic materials by comparing the stored design with the item in question.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An article comprising:

a substrate comprising a plurality of independent taggant layers that each include doped metal oxide nanocrystals comprising zirconium oxide nanocrystals that are doped with at least one Lanthanide element, said doped metal oxide nanocrystals comprise annealed metal oxide nanocrystals and comprise increased intensities in fluorescence;

wherein each taggant layer includes metal oxide nanocrystals that are doped with a different Lanthanide element than each other taggant layer.

2. The article of claim 1, wherein the taggant layers comprise a polymeric material or glass.

3. The article of claim 1, wherein the taggant layers comprise high density and low density polyethylene, polypropylene, polyurethane or mixtures thereof.

4. The article of claim 1, wherein the molar concentration of the Lanthanide element to the metal oxide nanocrystals is between about 3% and about 5%.

5. The article of claim 1, wherein the substrate contains at least four taggant layers.

6. The article of claim 1, wherein the substrate contains at least four taggant layers.

7. The article of claim 1, wherein the annealed metal oxide nanocrystals subjected to annealing temperatures from about 500° C. to about 1300° C.

8. An article comprising:

a substrate comprising a plurality of independent taggant layers that each include doped metal oxide nanocrystals comprising zirconium oxide nanocrystals that are doped with at least one Lanthanide element; said doped metal oxide nanocrystals comprise annealed metal oxide nanocrystals and comprise increased intensities in fluorescence, wherein each taggant layer includes metal oxide nanocrystals that are doped at a different molar concentration than each other taggant layer.

9. The article of claim 8, wherein the taggant layers comprise a polymeric material or glass.

10. The article of claim 8, wherein the taggant layers comprise high density and low density polyethylene, polypropylene, polyurethane or mixtures thereof.

11. The article of claim 8, wherein the molar concentration of the Lanthanide element to the metal oxide nanocrystals is between about 3% and about 5% for each taggant layer.

12. The article of claim 1, wherein the annealed metal oxide nanocrystals subjected to annealing temperatures from about 500° C. to about 1300° C.

13. The article of claim 7, wherein the annealed metal oxide nanocrystals comprise a first group of annealed metal oxide nanocrystals subjected to a first annealing temperature and a second group of annealed metal oxide nanocrystals subjected to a second annealing temperature; wherein the first annealing temperature is different than the second annealing temperature.

14. The article of claim 12, wherein the annealed metal oxide nanocrystals comprise a first group of annealed metal oxide nanocrystals subjected to a first annealing temperature and a second group of annealed metal oxide nanocrystals subjected to a second annealing temperature; wherein the first annealing temperature is different than the second annealing temperature.

* * * * *